United States Patent [19]
Lin et al.

[11] Patent Number: 5,666,466
[45] Date of Patent: Sep. 9, 1997

[54] METHOD AND APPARATUS FOR SPEAKER RECOGNITION USING SELECTED SPECTRAL INFORMATION

[75] Inventors: Qiguang Lin, Highland Park; James L. Flanagan, Warren; Ea-Ee Jan, Piscataway, all of N.J.

[73] Assignee: Rutgers, The State University of New Jersey, Piscataway, N.J.

[21] Appl. No.: 365,598

[22] Filed: Dec. 27, 1994

[51] Int. Cl.⁶ .................................................. G10L 7/08
[52] U.S. Cl. ........................................ 704/246; 704/222
[58] Field of Search ................................ 395/2.55, 2.56, 395/2.3, 2.31, 2.5

[56] References Cited

U.S. PATENT DOCUMENTS

| | | | |
|---|---|---|---|
| 4,078,154 | 3/1978 | Suzuki et al. | 395/2.45 |
| 5,054,085 | 10/1991 | Meisel et al. | 395/2.16 |
| 5,091,948 | 2/1992 | Kametani | 395/2.57 |
| 5,457,769 | 10/1995 | Valley | 395/2.19 |
| 5,522,012 | 5/1996 | Mammone et al. | 395/2.59 |

OTHER PUBLICATIONS

Jayant M. Naik, "Speaker Verification: A Tutorial", IEEE Communications Magazine, pp. 42–48 Jan. 1990.

Aaron E. Rosenberg and Frank K. Soong, "Recent Research in Automatic Speaker Recognition", in Advances in Speech Signal Processing, ed. by Sadaoki Furui and M. Mohan Sondhi, Marcel Dekker, Inc., chapter 22 1991.

Richard J. Mammone, Xiaoyu Zhang, and Ravi P. Ramachandran, "Robust Speaker Recognition", IEEE Signal Processing Magazine, pp. 58–71 Sep. 1996.

Bimbot, F. & Mathan L., "Text–Free Speaker Recognition Using an Arithmetic–Harmonic Sphericity Measure," Proc. of Eurospeech, pp. 169–172 (1993).

Doddington, G., "Speaker Recognition —Identifying People by their Voices," Proc. IEEE, vol. 73, No. 11, pp. 1651–1664 (Nov. 1985).

Kohonen, T., Kangas, J., Laaksonen, J. & Torkkola, K., "LVQ PAK: A program package for the correct application of learning vector quantization algorithms," Proc. of Int'l Joint Conf. on Neural Networks, 1–23 (1992).

*Primary Examiner*—Allen R. MacDonald
*Assistant Examiner*—Tálivaldis Ivars Šmits
*Attorney, Agent, or Firm*—Weil, Gotshal & Manges LLP

[57] ABSTRACT

A method and apparatus are disclosed for robust, text-independent (and text-dependent) speaker recognition in which identification of a speaker is based on selected spectral information from the speaker's voice. Traditionally, speaker recognition systems (i) render a speech sample in the frequency domain to produce a spectrum, (ii) produce cepstrum coefficients from the spectrum, (iii) produce a codebook from the cepstrum coefficients, and (iv) use the codebook as the feature measure for comparing training speech samples with testing speech samples. The present invention, on the other hand, introduces the important and previously unknown step of truncating the spectrum prior to producing the cepstrum coefficients. Through the use of selected spectra as the feature measure for speaker recognition, the present invention has been shown to yield significant improvements in performance over prior art systems.

10 Claims, 5 Drawing Sheets

METHOD AND APPARATUS FOR SPEAKER RECOGNITION USING SELECTED SPECTRAL INFORMATION

BACKGROUND OF THE INVENTION

1. Field of the Invention

The present invention relates to computer-assisted speaker (as opposed to speech) recognition technology. A method and apparatus are disclosed for robust, text-independent (or text-dependent) speaker recognition in which identification of a speaker is based on selected spectral information from the speaker's voice.

2. Description of the Prior Art

Human speech is propagated through the air by speech waves. A speech wave is the response of a speaker's vocal tract system to the glottal source (as in /a/), the friction source (as in /s/), or combinations of the two sources (as in /z/). Acoustically, the vocal tract system is a resonator, whose resonance frequencies are governed by the size and shape of the vocal tract and the positions of its active articulators, such as the tongue.

A speech wave contains phonetic/linguistic information that conveys a particular message, as well as identity information that is uniquely characteristic of a speaker. In general, the pattern of the resonance frequencies determines the phonetic/linguistic content of speech, while speaker identity is correlated with physiological (and also behavioral) characteristics of a speaker.

In the frequency domain, phonetic/linguistic information is mainly confined to the frequency range of approximately 0 to 5 kHz. For example, conventional telephone speech is band-limited from 300 to 3200 Hz, and highly intelligible speech is synthesized from formants in frequencies below 5 kHz. Speaker identity information, on the other hand, is spread over the entire frequency axis. For example, speaker-specific attributes based on glottal sources are mainly confined to the low frequency range, while speaker-specific attributes based on friction sources are carried mainly in the high frequency range. High frequency spectra also contain information about cross-modes of the vocal tract, the size of the larynx tube, and the overall length of the vocal tract.

Yet, despite the above-noted differences in the spectral content of speech, the same spectral information has traditionally been used for work with respect to both speaker recognition and speech recognition technologies. In general, spectral information in the frequency range of 0 to 4 kHz has typically been used in both speaker and speech recognition systems.

Thus, while advancements have been made in computer-assisted speaker recognition during the past two decades, contemporary speaker recognition systems are nevertheless subject to a variety of problems. These problems include: (i) sample variability due to inter-session variations in a speaker's voice; (ii) sample degradation due to environmental interferences, such as room reverberations and room noises; and (iii) imposter attack by persons who can effectively mimic a particular speaker's voice.

SUMMARY OF THE INVENTION

Accordingly, it is a goal of the present invention to address the limitations of the prior art and to offer an improved method for speaker recognition. To this end, the present invention represents a fundamental departure from, and significant advancement over, prior art speaker recognition techniques.

Specifically, the present invention uses a new approach in which sound spectra in the high frequency range is selectively utilized for robust text-independent (or text-dependent) speaker recognition. According to the present invention, spectral information from a speech sample is discarded for frequencies below a minimum frequency, $f_1$, and for frequencies above a maximum frequency, $f_h$, where these frequencies are chosen (i) to exclude phonetic/linguistic information and/or environmental interferences in the low frequency range and (ii) to include identity information in the high frequency range. From this selected spectral information, a speaker may be accurately recognized based on a comparison with a reference speech sample of the speaker.

The present invention represents a significant advancement over prior art techniques of speaker recognition in at least three material respects. First, inter-session variability is reduced, as the phonetic/linguistic information conveyed in low frequencies is removed from the measured speech values used in the present invention. Second, the present invention is more robust against room reverberations and room noises, as these sources of error are typically more prominent in the low frequencies which are removed from the measured speech values used in the present invention. Third, the present invention is more robust against imposters, as details of the signal spectrum at high frequencies (which are highly dependent on a speaker's unique physiology) are difficult to mimic.

BRIEF DESCRIPTION OF THE DRAWINGS

The foregoing advantages of the present invention are apparent from the following detailed description of the preferred embodiment of the invention with reference to the drawings, in which.

PREFERRED EMBODIMENT OF THE INVENTION

1. System for Using the Present Invention

Figure 1:
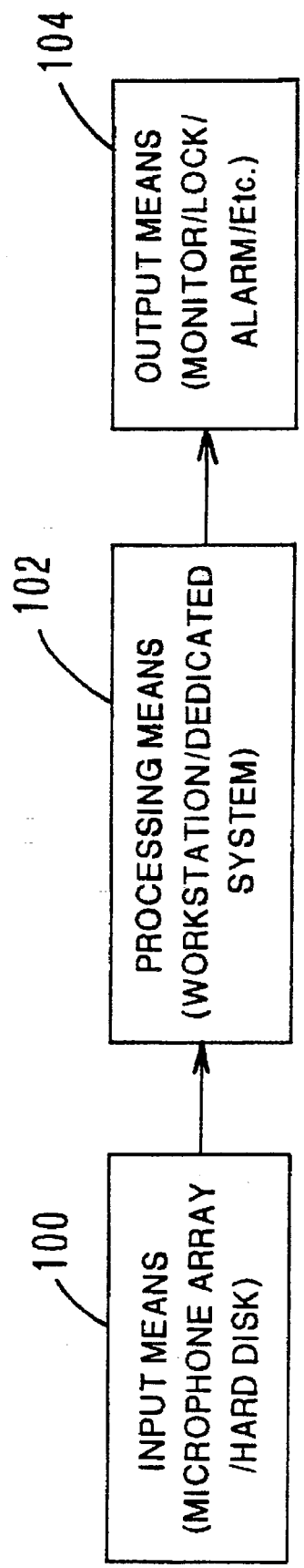
FIG. 1 shows a block diagram of the configuration of a system to which the present invention applies.

FIG. 1 shows a block diagram of the configuration of a system to which the present invention applies. The system is comprised of three main elements: (i) an input means 100, (ii) a processing means 102, and (iii) an output means 104.

The input means 100 provides input to the system. The input means 100, for example, may be a high-quality microphone or microphone array for speech input and accompanying analog-to-digital conversion board for producing digital speech signals representative of the analog speech input. In the alternative, the input means 100 may be a digital-storage device, such as a CD-ROM or hard-disk drive, on which previously recorded speech samples are contained in digital form.

The processing means 102 processes input and performs other logical functions. The processing means 102, for example, may be a computer workstation, such as a Sun Sparc workstation, and accompanying computer software for implementing the present invention. In the alternative, the processing means may be a dedicated digital system, such as in an automated teller machine, for processing speech signals in accordance with the principles of the present invention.

The output means 104 performs some function based on the results of signal processing. In a first embodiment of the invention, the output means 104 may be a display device, such as a computer monitor. In a second embodiment of the invention, the output means 104 may be a lock regulating physical or electronic access to a particular area or data set. In a third embodiment of the invention, the output means 104 may activate an alarm. Additional and further output means 104 (and combinations thereof) are possible.

2. Speaker Recognition According to the Prior Art

Figure 2:
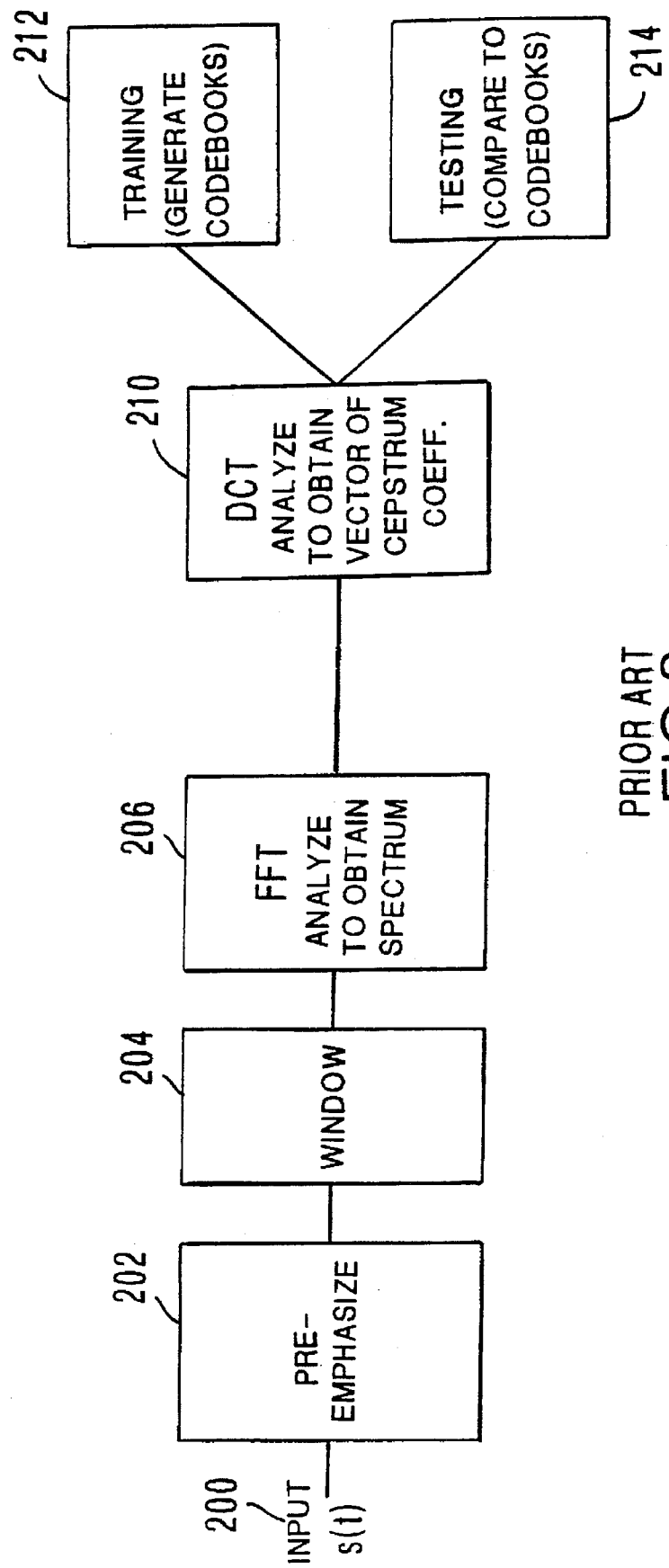
FIG. 2 shows a block diagram of the manner of operation of a typical prior art system for speaker recognition.

FIG. 2 shows a block diagram of the manner of operation of a typical prior art system for speaker recognition.

The basic unit of input 200 is a frame of an input speech signal, s(t). The input 200 consists of a speech signal digitally sampled at a rate, $f_s$, at least twice a maximum frequency, $2f_h$. Sampling at this rate ensures that the input 200 maintains spectral information up to $f_h$. In prior art systems, the input 200 typically contains 30 milliseconds of sampled speech, which produces 240 data points when sampled at a rate of 8 kHz. In addition, certain frames of input 200 are discarried where the frame's short term energy is too small,for processing. This occurs, for example, during pauses in speech.

The input 200 is processed in steps 202, 204 and 206. Step 202 pre-emphasizes the input 200 with a first-order zero filter. Step 204 then applies a window function, such as the Hamming window, to the pre-emphasized signal. Finally, step 206 transforms the pre-emphasized, windowed signal to the frequency domain through zero-padding and fourier transformation. Typically, step 206 extends the number of data points to a power of two and applies the fast fourier transform ("FFT") algorithm to the data set. Thus, for a frame with 240 data points, zero values are added to create a data set of a power of two (e.g., a data set with 256, 512 or 1024 data points), to which is applied one of the FFT computer algorithms available in the public domain.

Figure 4:
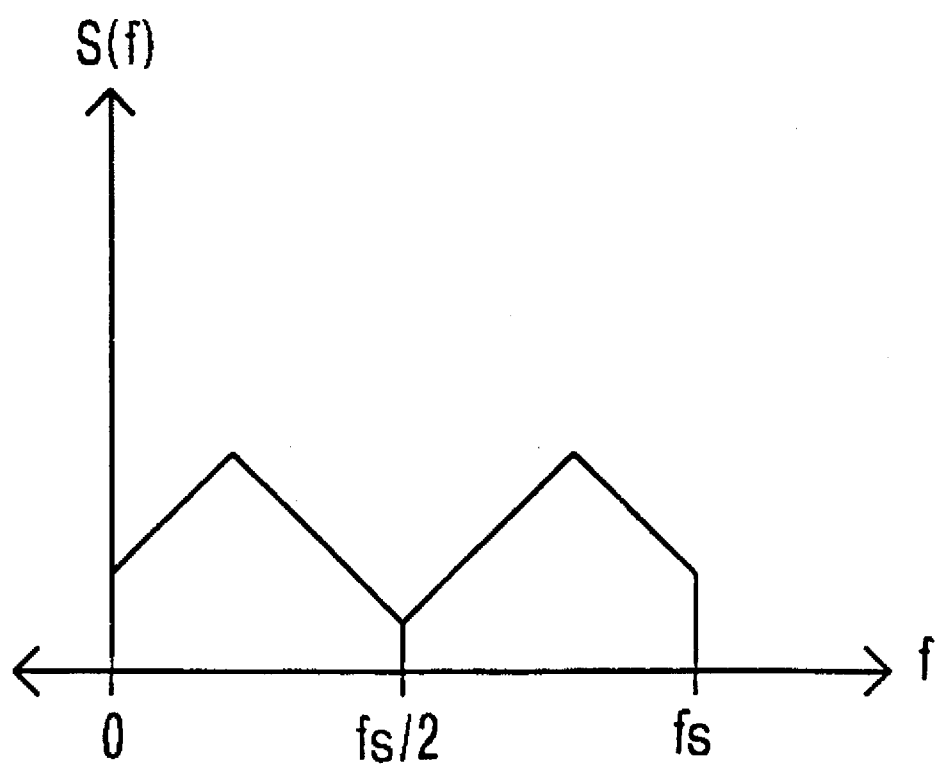
FIG. 4 shows the FFT amplitude spectrum used in a typical prior art system for speaker recognition.

FIG. 4 shows the FFT amplitude spectrum, S(f), after completion of step 206. It is a symmetric spectrum in which spectral information is preserved for all frequencies from 0 to $f_s/2$.

Step 210 then creates a set of cepstrum coefficients, c(n), based on S(f). One method for deriving cepstrum coefficients is through discrete cosine transform ("DCT") of S(f), in which:

$$c(i) = \frac{1}{N} \sum_{k=0}^{N-1} S\left(\frac{2\pi k}{N}\right) \cdot \cos(\pi k i), i = 1, 2, \ldots, Q$$

where c(i) is the i-th cepstrum coefficient, Q is the number of cepstrum coefficients, and N is the number of points used in FFT computation. The set of Q cepstrum coefficients are collected into a vector of coefficients. Typically, for a sampling frequency of 16 kHz, Q is chosen so that the vector of cepstrum coefficients has a dimensionality of 20. (Other methods for deriving cepstrum coefficients are possible. In addition, features other than cepstrum coefficients, such as linear prediction coefficients and line spectral pairs, have also been used in speaker recognition systems. One of ordinary skill in the art will recognize that it is possible to adapt the present invention to use these alternative methods.)

After preparing the vector of cepstrum coefficients, the vector is processed as training data or testing data. Thus, if the input 200 is from a known speaker and is being acquired for the purpose of building a codebook representing this known speaker, system flow continues with step 212. If, on the other hand, the input 200 is from an unknown speaker and is being acquired for the purpose of testing the speech input with known codebooks, system flow continues with step 214.

Step 212 processes the vector of cepstrum coefficients as training data. Typically, this process involves storing a sequence of the vectors until cepstrum coefficients are prepared for each frame of input 200, as a number of short-duration frames of input 200 are typically required for effective training or testing. After collecting the entire set of vectors, a vector quantization ("VQ") algorithm is run on the entire set of stored vectors. Good results have been shown for a speaker recognition system constructed according to the principles of the present invention using a high-quality VQ algorithm available as public-domain computer software from Kohonen et al. See Teuvo Kohonen, et al., LVQ_PAK: The Learning Vector Quantization Program Package, Version 2.1, Oct. 9, 1992, available for non-commercial, anonymous use at the Internet site cochlea.hut.fi (130.233.168.48). Other software programs and other mathematical methods, however, may be substituted for this particular VQ algorithm.

To prepare a codebook, the VQ algorithm extracts a set of M vectors (of cepstrum coefficients) from the entire set of such vectors prepared during training. For a 6.0 second sample of training data broken into 30-millisecond frames of input 200, as many as two-hundred vectors are prepared during training. The set of M vectors are extracted from the entire set of vectors using mathematical principles of grouping and centroids, and computer algorithms based on neural-network principles are often employed in this process. Typically, for training data in the English language, the number of vectors, M, is approximately 40. While the set of M vectors, i.e., the centroids of the codebook, reflects the larger set of training data, it is smaller, and therefore, easier to work with in processing testing data. The resulting set of M vectors, each having Q elements, are collected into an M×Q matrix unique to the speaker of the training speech signal. It is this matrix of elements which is called a "codebook" and which is used for comparing training speech and testing speech in most systems for computer-assisted speaker recognition. (However, other pattern-detection methods, such as hidden-Markov models, have also been used in speaker recognition systems, and it is possible to adapt the present invention to such methods.)

In the alternative, if the vector of cepstrum coefficients prepared in step 210 is based on testing data, step 214 is executed. In step 214, the cepstrum coefficients of the testing data are compared to the vectors in one or more codebooks prepared according to step 212. Typically, the closest vector (i.e., row entry) in a codebook is found and the vector distance between the closest vector and the testing vector (e.g., the sum of the squares of the differences between the Q elements in each) is determined. This vector distance is added to an accumulated vector distance for all of the frames of input 200 that comprise the testing data, with a separate accumulated vector distance maintained with respect to each codebook (i.e., each reference speaker).

In addition to the above-described comparison logic, step 214 contains further decision-making logic for processing testing data. For example, speaker recognition may involve identification (i.e., determining to which one of a plurality of speakers a testing speech sample most likely belongs) or verification (i.e., determining whether a testing speech sample "matches" a particular speaker). For identification, a unique codebook is generated according to step 212 for each speaker recognized in a system. In step 214, testing data is then compared to each of the codebooks and is associated with the codebook (and speaker) characterized by the smallest accumulated vector distance. For verification, testing data is compared to one particular codebook generated according to step 212, and this codebook (and speaker) are considered a "match" if and only if the accumulated vector distance is below an error threshold, ξ, defined in the system.

After processing one frame of input 200, steps 212 and 214 return control to step 202 for processing additional frames, if they exist.

13. Speaker Recognition According to the Present Invention

Figure 3:
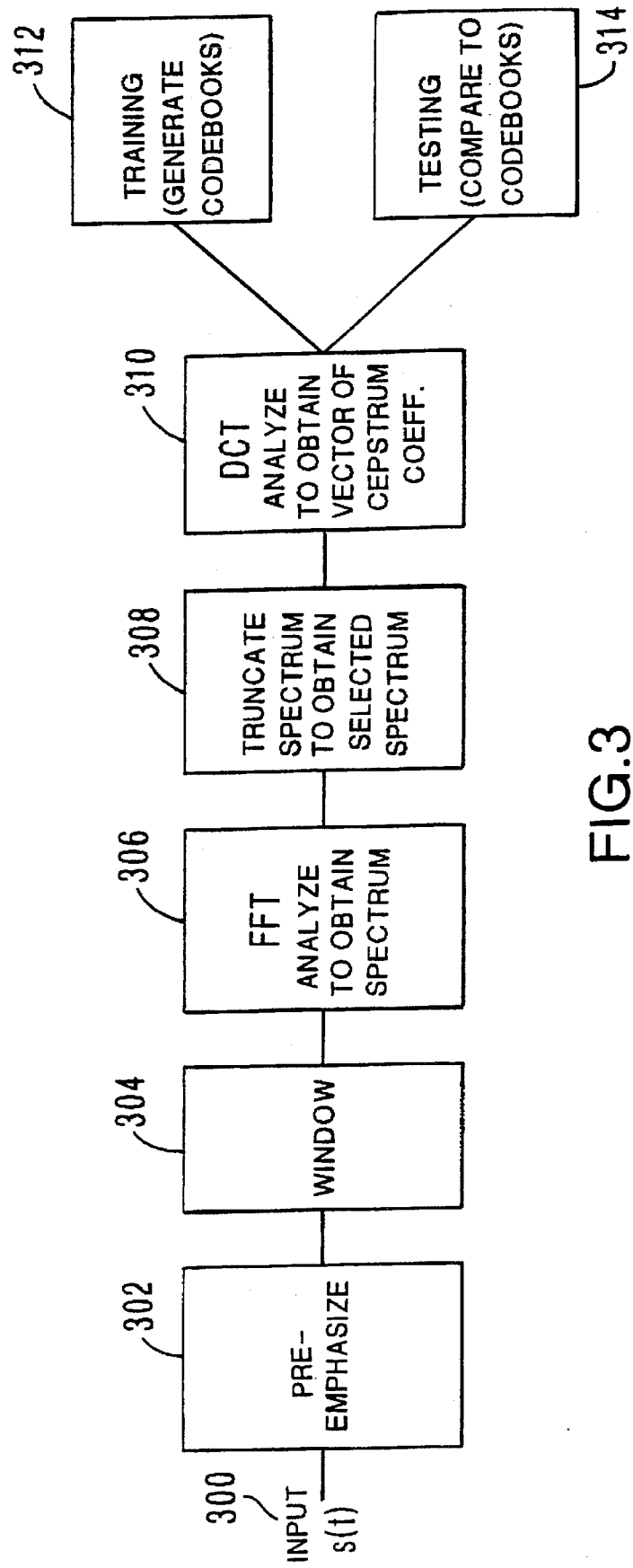
FIG. 3 shows a block diagram of the manner of operation of a system constructed in accordance with the principles of the present invention.

FIG. 3 shows a block diagram of the manner of operation of a system constructed in accordance with the principles of the present invention.

Most of the steps in the present invention are similar to, or may be equivalent to, steps used in prior-art techniques. Thus, steps 302, 304 and 306 pre-emphasize, window and FFT analyze a frame of input in a manner similar to steps 202, 204 and 206. In addition, step 310 prepares a vector of cepstrum coefficients and steps 312 and 314 process such a vector in a manner similar to steps 210, 212 and 214.

However, according to the present invention, an important and previously unknown step is inserted in the process between step 306 (FFT analysis) and step 310 (cepstrum coefficient preparation). This new step, step 308, takes the FFT amplitude spectrum, S(f), prepared in step 306, and selectively truncates it. Spectral information is discarried for frequencies below a minimum frequency, $f_1$, and for frequencies above a maximum frequency, $f_h$, where $f_1$ and $f_h$ are chosen (i) to exclude phonetic/linguistic information in the low frequency range and (ii) to include identity information in the high frequency range. The truncated FFT amplitude spectrum, E(f), is comprised of the mirror-image pair, $E_1(f)$ and $E_2(f)$, in which:

$$E_1(f-f_1)=S(f), \text{ for } f_1 \leq f \leq f_h$$

$$E_2(f-f_s+2f_1)=S(f) \text{ for } f_s-f_h \leq f \leq f_s-f_1$$

Figure 5A:
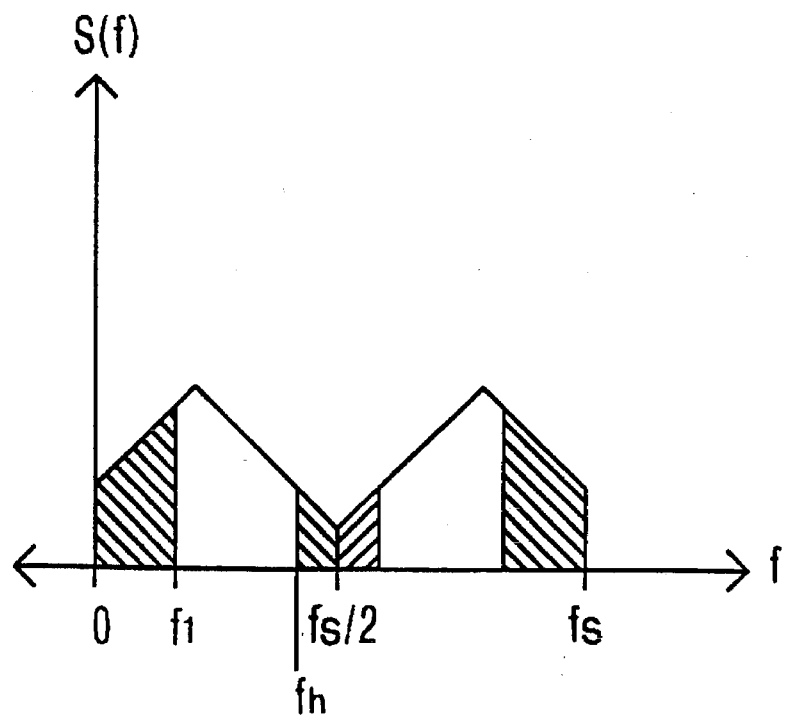
FIG. 5A shows the untrauncated and FIG. 5B the truncated FFT amplitude spectrum used in a system constructed in accordance with the principles of the present invention.
Figure 5B:
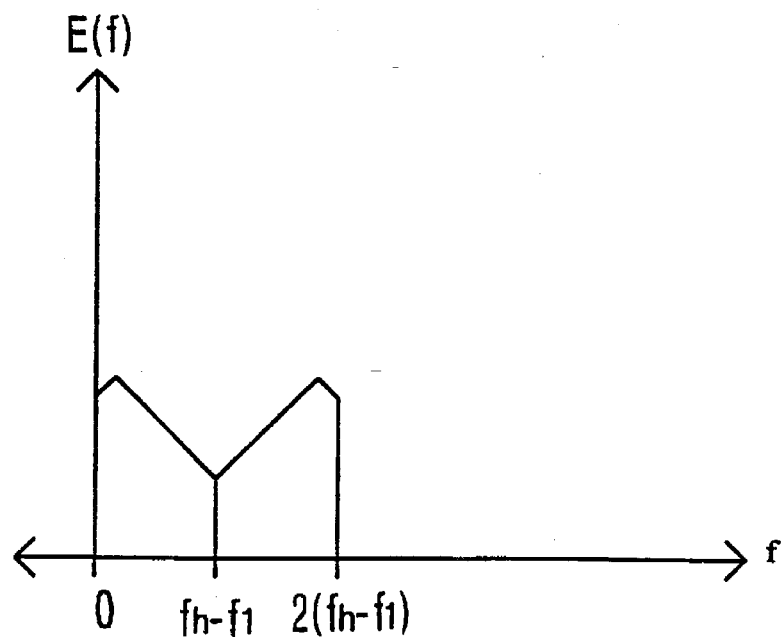

FIG. 5A shows the FFT amplitude spectrum, S(f), prior to execution of step 308. FIG. 5B shows the truncated FFT amplitude spectrum, E(f), after completion of step 308. Spectral information is preserved in the signal only for frequencies between $f_1$ and $f_h$, and spectral information is eliminated for frequencies below $f_1$ and above $f_h$. The truncated FFT amplitude spectrum, E(f), is then used in step 310 to generate the vector of cepstrum coefficients.

A wide range of frequencies are possible for both $f_1$ and $f_h$, and in general, the choice of $f_1$ and $f_h$ depends on the parameters of the specific application. Thus, in certain embodiments, such as for use in situations where room noises and reverberations are confined to relatively low frequencies, $f_1$ may be as low as 1 kHz or 2 kHz. In such a situation, a system using the truncated spectrum (without these low frequencies) performs better than a system failing to exclude these low frequencies. In other embodiments, $f_1$ may be as high as 6 kHz or 7 kHz, such as for use in situations with narrow-bandwidth transmission channels (e.g., the permissible spectrum is band-limited to a range of 2 kHz). In such a situation, a system using the truncated spectrum (e.g., a spectrum from 6 to 8 kHz) performs better than a system using a traditional spectrum (e.g., a spectrum from 0 to 2 kHz). In general, there are few restrictions on $f_h$, other than those imposed by the sampling frequency, $f_s$ (which requires that $f_h$ be less than one-half of $f_s$) and the minimum frequency, $f_1$ (which requires that $f_h$ be greater than $f_1$). Typically, though, $f_h$ will be in the range of 5 to 10 kHz. As discussed below, impressive results have been seen in an embodiment of the invention in which $f_1$ is 3 kHz and $f_h$ is 8 kHz.

Of course, certain parameters used in prior art systems for speaker recognition may differ in the present invention. For example, if $f_h$ is 8 kHz in a system according to the present invention, $f_s$ must be at least 16 kHz to preserve spectral information. With such a sampling frequency, a frame of input 300 that is 30 milliseconds in duration then produces 480 data points (instead of 240 data points) for FFT analysis.

In addition, it is possible to use other presently known techniques of speaker recognition, such as line spectrum pair analysis, direct spectrum analysis or filter-bank output analysis, without departing from the spirit of the present invention. The invention is essentially a filtering process of the speech spectrum in which the portion of the speech spectrum which conveys speaker identity information and which is less susceptible to environmental interference and inter-session variation is used as the feature measure for speaker recognition. Thus, faltering may even be done in the time domain by passing an input speech signal through a band-pass filter having cut-off frequencies $f_1$ and $f_h$ to achieve the same result as filtering in the frequency domain by using selected spectral components. These and other changes, though, are readily apparent to one of ordinary skill in the art, who may suitably alter any conventional speaker recognition system to achieve the improved results apparent from the present invention.

Like other text-independent speaker recognition systems, the present invention applies in numerous contexts, including security-control situations, teleconferencing, surveillance, and forensics. In addition, it is possible to use the present invention in applications with relatively narrow-bandwidth transmission channels. For example, the present invention may be used with conventional telephone fines (which are band-limited from 300 to 3200 Hz) by using a digital telephone for input (which preserves frequency content up to at least 8 kHz) and digitally modulating the selected spectrum (e.g., moving the 3 kHz-wide frequency spectrum in the range of 5 to 8 kHz into the 0 to 3 kHz range) prior to its inverse transformation and analog transmission over the telephone fine. Alternatively, a digital representation of the frequency spectrum could be transmitted in binary form over a conventional telephone fine according to a protocol defined by the processing means on the other side of the transmission channel.

A preliminary evaluation of the present invention has been made using a text-independent speaker identification system based on VQ techniques. The table below gives the experimental results for the New England subset of the TIMIT database, a widely-distributed CD-ROM database of speech samples used for training and testing speaker recognition systems. The subset of the database comprises speech samples from 24 male and 14 female speakers. Each of the speakers has five testing utterances, resulting in a total of 190 trials.

It is seen from the table that the present invention yields impressive results and represents a significant improvement over prior art methods of speaker recognition. The evaluation data supports the conclusion that examination of selected spectral information from high frequencies is a more reliable feature on which to base speaker recognition than the examination of non-truncated spectral information from low frequencies. Indeed, for a bandwidth of 5 kHz, a system embodying the method of the present invention is approximately 5 times more robust than a prior art system.

| Type of system | Speaker identification error rates using selected parameters, where M denotes the number of codebook entries and Q denotes the order of cepstrum coefficients. | | | | | |
|---|---|---|---|---|---|---|
| (frequency range of spectrum used in examination) | Q = 20 | | | M = 43 | | |
| | | | | Q = 1 | Q = 1 | Q = 2 |
| | M = 37 | M = 40 | M = 43 | 6 | 8 | 2 |
| Prior art system (0–5 kHz) | 5.8% | 4.2% | 4.2% | 6.3% | 5.3% | 4.2% |
| Present Invention (3–8 kHz) | 1.1% | 1.6% | 1.1% | 0.5% | 1.1% | 1.1% |

In this way, the present invention provides a means for recognizing a speaker using selected spectral information. Although the invention has been shown and described in terms of a preferred embodiment, those persons of ordinary skill in the art will recognize that modification to the preferred embodiment may be made without departure from the spirit of the invention as claimed below.

We claim:

1. In a method for speaker recognition, of the type wherein a speech sample is processed, the improvement comprising band-pass filtering the speech sample with a filter having a minimum frequency greater than 1 kHz and a maximum frequency between 5 and 10 kHz, wherein said band-pass filtering preserves spectral information in the speech sample for a range of frequencies between the minimum frequency and the maximum frequency, and excludes spectral information outside of the range.

2. The method of claim 1, wherein said minimum frequency is greater than 2 KHz and is chosen to substantially exclude phonetic/linguistic information from the speech sample, and said maximum frequency is less than 8 kHz and is chosen to substantially include identity information from the speech sample.

3. The method of claim 1, wherein said minimum frequency is 3 kHz and said maximum frequency is 8 kHz.

4. In a method for speaker recognition, of the type wherein a speech sample is transformed into the frequency domain to produce a spectrum for processing, improvement comprising truncating the spectrum, wherein said truncation preserves spectral information in the spectrum for a range of frequencies between a minimum frequency greater than 1 kHz and a maximum frequency between 5 and 10 kHz, and excludes spectral information outside of the range.

5. The method of claim 4, wherein said minimum frequency is greater than 2 kHz and is chosen to substantially exclude phonetic/linguistic information from the speech sample, and said maximum frequency is less than 8 kHz and is chosen to substantially include identity information from the speech sample.

6. The method of claim 4, wherein said minimum frequency is 3 kHz and said maximum frequency is 8 kHz.

7. A method for speaker recognition which relies on an accumulated vector distance between a training speech sample and a testing speech sample, which method comprises the steps of:

(a) dividing the training speech sample into a plurality of speech frames;

(b) for each speech frame of the training speech sample:
transforming the speech frame into the frequency domain to produce a spectrum;
truncating the spectrum to produce a selected spectrum, said selected spectrum preserving spectral information in the speech frame for a range of frequencies between a minimum frequency greater than 1 kHz and a maximum frequency between 5 and 10 kHz, and excluding spectral information outside of the range; and
producing cepstrum coefficients based on the selected spectrum;

(c) preparing a codebook collectively based on the cepstrum coefficients produced in step (b) for each speech frame, the codebook (i) having a plurality of codebook vectors and (ii) being the feature measure for comparing the training speech sample with the testing speech sample;

(d) dividing the testing speech sample into a plurality of speech frames;

(e) for each speech frame of the testing speech sample:
transforming the speech frame into the frequency domain to produce a spectrum;
truncating the spectrum to produce a selected spectrum, said selected spectrum preserving spectral information in the speech frame for the range of frequencies between the minimum frequency and the maximum frequency, and excluding spectral information outside of the range;
producing cepstrum coefficients based on the selected spectrum;
for each codebook vector of the codebook prepared in step (c), computing a vector distance between the codebook vector and the cepstrum coefficients; and
selecting a minimum vector distance from the vector distances for all the codebook vectors; and (f) computing the accumulated vector distance based on a summation of the minimum vector distances produced in step (e) for each speech frame, the accumulated vector distance being the feature measure for determining speaker recognition.

8. The method of claim 7, wherein said minimum frequency is greater than 2 kHz and is chosen to substantially exclude phonetic/linguistic information from the training speech sample, and said maximum frequency is less than 8 kHz and is chosen to substantially include identity information from the training speech sample.

9. The method of claim 7, wherein said minimum frequency is 3 kHz and said maximum frequency is 8 kHz.

10. A machine for speaker recognition according to the method of any one of claims 1, 2, 3, 4, 5, 6, 7, 8, or 9.

* * * * *

UNITED STATES PATENT AND TRADEMARK OFFICE
CERTIFICATE OF CORRECTION

PATENT NO. : 5,666,466
DATED : September 9, 1997
INVENTOR(S) : Flanagan, James L., Lin, Qiguang and Jan, Ea-Ee It is certified that error appears in the above-identified patent and that said Letters Patent is hereby corrected as shown below:

Column 1,
Line 14, insert as a new paragraph:
-- 2. Government Funding
The invention described herein was made with government support under grant DABT63-93-C-0037 awarded by the Advanced Research Projects Agency (ARPA). The United States Government has certain rights in the invention. --
Line 15, the number "2" should be read -- 3. --.

Signed and Sealed this

Twenty-first Day of June, 2005

JON W. DUDAS
*Director of the United States Patent and Trademark Office*